(12) United States Patent
Liang

(10) Patent No.: US 7,963,745 B1
(45) Date of Patent: Jun. 21, 2011

(54) COMPOSITE TURBINE BLADE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 963 days.

(21) Appl. No.: 11/827,051

(22) Filed: Jul. 10, 2007

(51) Int. Cl.
*F01D 5/08* (2006.01)
(52) U.S. Cl. .... 416/97 R; 416/224; 416/226; 416/241 R
(58) Field of Classification Search .................. 415/115; 416/97 R, 224, 226, 228
See application file for complete search history.

(56) References Cited

U.S. PATENT DOCUMENTS

| | | | |
|---|---|---|---|
| 4,563,128 A | | 1/1986 | Rossmann |
| 4,583,814 A | * | 4/1986 | Koetser .......................... 374/124 |
| 4,786,234 A | * | 11/1988 | Readnour .................... 416/97 R |
| 5,511,940 A | * | 4/1996 | Boyd .......................... 415/209.2 |
| 5,616,001 A | | 4/1997 | Boyd |
| 5,827,045 A | | 10/1998 | Beeck |
| 6,000,906 A | * | 12/1999 | Draskovich ................ 415/209.4 |
| 6,241,469 B1 | | 6/2001 | Beeck et al. |
| 6,709,230 B2 | | 3/2004 | Morrison et al. |
| 7,033,136 B2 | * | 4/2006 | Botrel et al. ................... 415/115 |
| 7,607,287 B2 | * | 10/2009 | Reba et al. .................... 60/226.1 |

* cited by examiner

Primary Examiner — Edward Look
Assistant Examiner — Ryan H Ellis
(74) Attorney, Agent, or Firm — John Ryznic

(57) ABSTRACT

A composite turbine blade for use in a gas turbine engine under high gas flow temperature. The blade includes a root and platform portion formed out of the standard high temperature resistant metallic material of the prior art blades and with a near wall cooled metallic spar extending along the suction side wall of the blade and wrapping around the leading edge and the trailing edge portions of the blade. The wrap around spar forms a concave opening in which a ceramic or carbon fiber mid chord section of the blade is secured to form the composite blade. The solid ceramic or carbon fiber mid-chord blade is exposed to the pressure side hot gas flow and requires no cooling. Radial cooling channels with pin fins extend along the blade spar on the leading and trailing edges and on the suction side wall to provide cooling for the metallic portions of the composite blade. Spanwise attachment hooks extend out from the concave surface of the spar to form attachment hooks for the ceramic or carbon fiber mid-chord section of the blade. A radial attachment pin extends from the mid-chord section and through a hole formed in the root portion to secure the mid-chord section to the root and spar against radial displacement during rotation of the blade.

14 Claims, 3 Drawing Sheets

COMPOSITE TURBINE BLADE

BACKGROUND OF THE INVENTION

1. Field of the Invention

The present invention relates generally to fluid reaction surfaces, and more specifically to composite turbine blade.

2. Description of the Related Art Including Information Disclosed Under 37 CFR 1.97 and 1.98

In a gas turbine engine, such as an aero engine to power an aircraft or an industrial gas turbine engine to produce electric power, a hot gas flow is passed through a turbine to extract mechanical power. The efficiency of the engine can be increased by passing a higher temperature gas flow through the turbine. However, the highest temperature allowed is dependent upon the material properties of the turbine components, especially the first stage stator vanes and rotor blades. Thus, complex internal cooling circuits have been used to provide convection, impingement and film cooling to the airfoils to allow for higher temperatures.

Airfoils made entirely of a ceramic material has been proposed because the ceramic material can be exposed to a much higher temperature than the modern super-alloys. However, ceramic matrix composites (CMC) are brittle and do not have the strength and rigidity to operate within the engine. Some prior art turbine blades and vanes have been proposed in which a ceramic material is secured to a metallic material to form a composite turbine airfoil. However, the thermal coefficients of the ceramic and metallic materials are so different that high stresses are developed that also lead to problems for use in the engine.

Another design problem with turbine blades is providing for cooling air. The pressurized cooling air use to cool the blade typically is bled off from the compressor of the engine. The work to compressor the cooling air is not used to produce power in the engine, and is therefore wasted. Providing for a turbine blade that would require less cooling air would increase the efficiency of the engine.

Metallic turbine blades that are exposed to the high temperature of the turbine also suffer from thermal metallic fatigue (TMF) which tends to reduce the useful life of the blade. Hot spots that occur around the blade due to lack of adequate cooling also can cause erosion problems that will shorten the blade life.

For the industrial gas turbine engine design, large turbine blades can be heavy due to the requirement that the blade be made with enough strength to withstand the centrifugal loads from rotation under high temperatures that cause problems with creep. Turbine blade design attempts to produce the lightest weight blade that will withstand the high temperature and mechanical loads from engine operation. A lightweight blade design would allow for a higher $AN^2$ which leads to higher engine efficiency.

It is therefore an object of the present invention to provide for a turbine blade with a reduced blade cooling flow requirement over the prior art turbine blades.

It is another object of the present invention to provide for a turbine blade with a reduced hot gas side convection surface required to be cooled for the spar.

It is another object of the present invention to provide for a turbine blade which eliminates the TMF issue normally experienced in the near wall cooling design of a turbine blade.

It is another object of the present invention to provide for a turbine blade with a high temperature resistant material on the pressure side of the blade which will eliminate the main body and the pressure side tip edge film cooling required in the prior art blades and thus reduce the blade total cooling flow demand and reduce the manufacturing complexity.

It is another object of the present invention to provide for a turbine blade with a light weight construction to allow for the turbine to be designed with a higher $AN^2$ that the prior art turbine blades.

BRIEF SUMMARY OF THE INVENTION

A composite turbine blade for use in a gas turbine engine under high gas flow temperature. The blade includes a root and platform portion formed out of the standard high temperature resistant metallic material of the prior art blades and with a near wall cooled metallic spar extending along the suction side wall of the blade and wrapping around the leading edge and the trailing edge portions of the blade. The wrap around spar forms a concave opening in which a ceramic or carbon fiber mid chord section of the blade is secured to form the composite blade. The solid ceramic or carbon fiber mid-chord blade is exposed to the pressure side hot gas flow and requires no cooling. Radial cooling channels with pin fins extend along the blade spar on the leading and trailing edges and on the suction side wall to provide cooling for the metallic portions of the composite blade. Spanwise attachment hooks extend out from the concave surface of the spar to form attachment hooks for the ceramic or carbon fiber mid-chord section of the blade. A radial attachment pin extends from the mid-chord section and through a hole formed in the root portion to secure the mid-chord section to the root and spar against radial displacement during rotation of the blade.

DETAILED DESCRIPTION OF THE INVENTION

Figure 1:
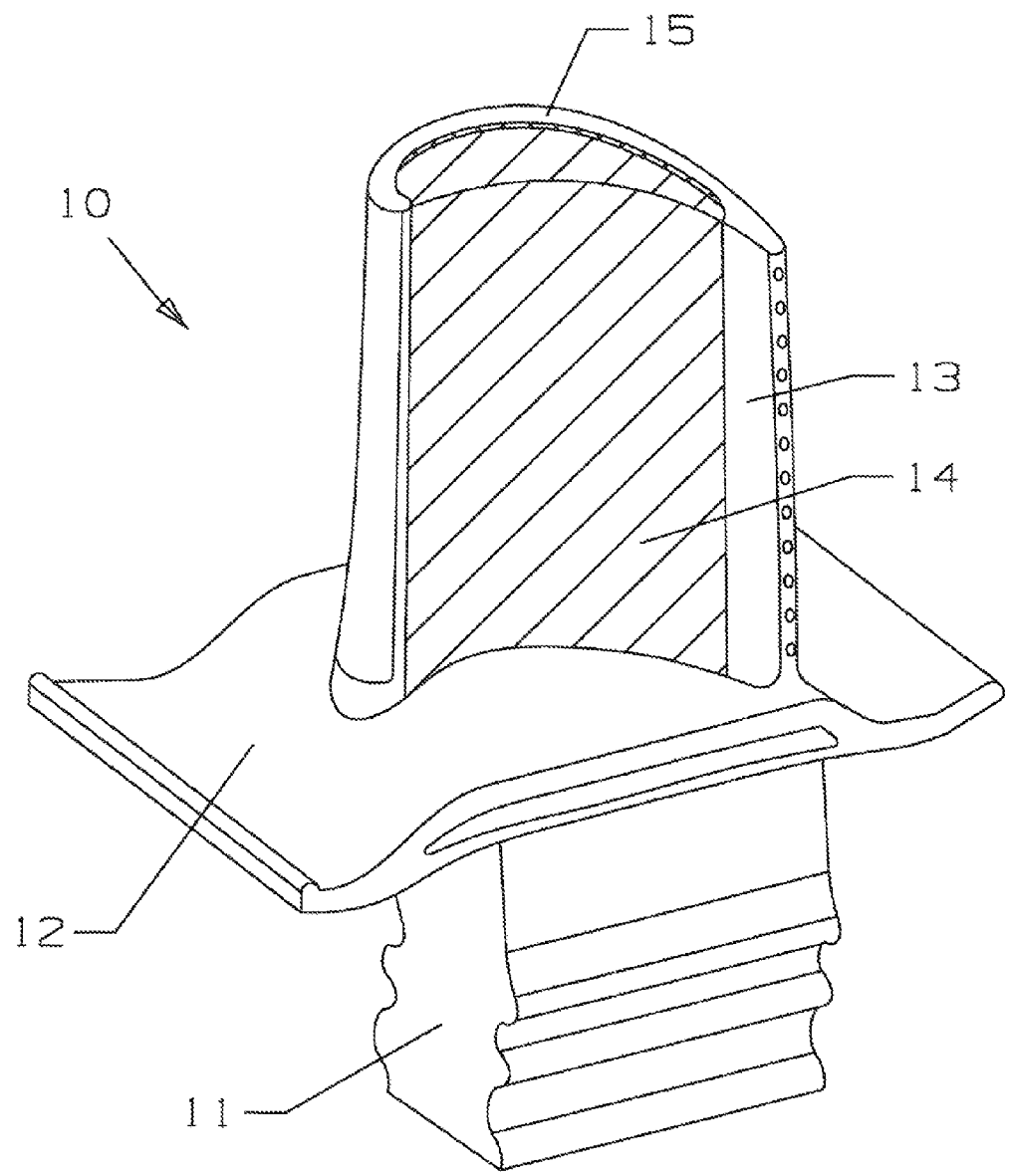
FIG. 1 shows a schematic view form the pressure side of the composite turbine blade of the present invention.

The present invention is a composite turbine blade 10 having a root portion 11 with a fir tree configuration for engagement with a slot in a rotor disk of a gas turbine engine as seen in FIG. 1, a platform portion 12 and an airfoil portion that includes a metallic spar 13 and a high temperature resistant material forming a mid-chord or suction side portion 14 of the blade. The spar 13 includes a suction side tip with near wall cooling channels extending from the leading edge to the trailing edge of the airfoil and along the suction side for cooling.

Figure 2:
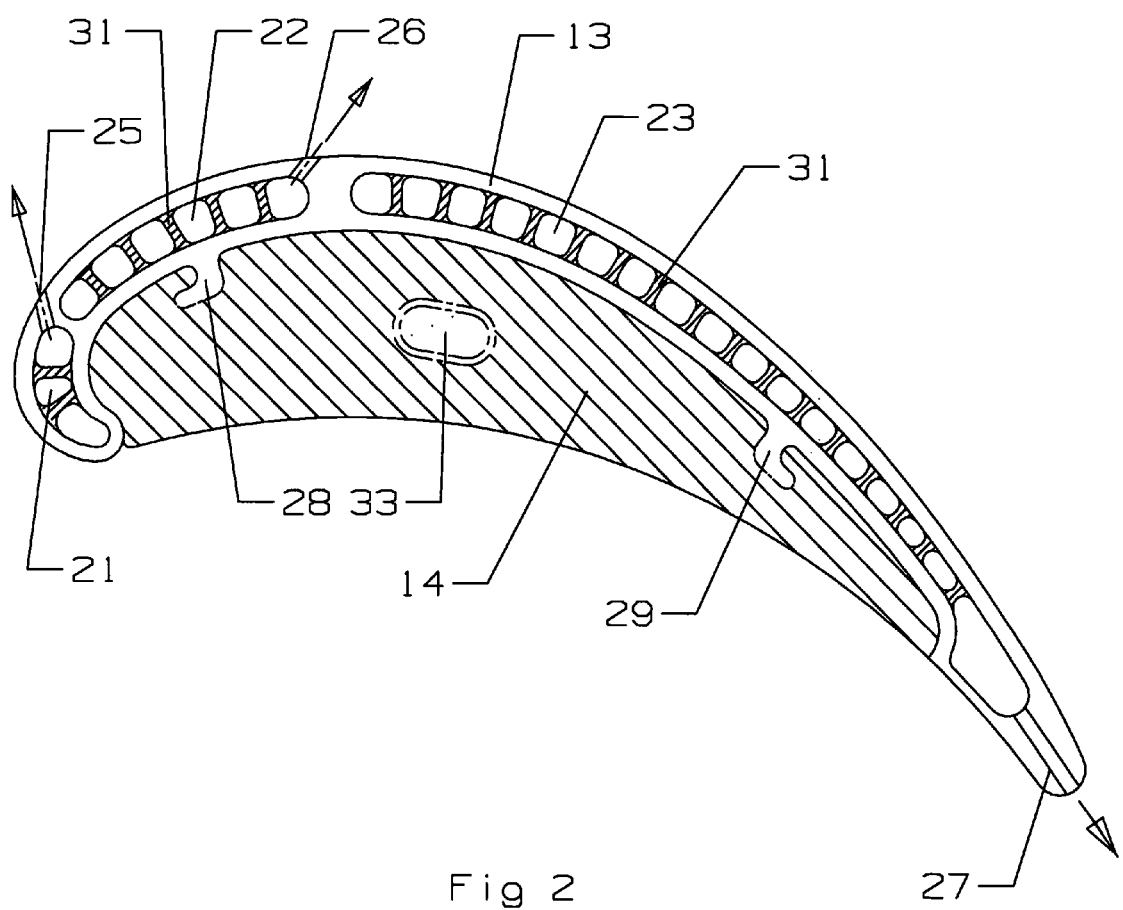
FIG. 2 shows a cross sectional top view of the composite turbine blade of the present invention.

FIG. 2 shows a cross section top view of the composite blade of FIG. 1. The metal spar forms a concave opening between the leading edge, the trailing edge and the suction side wall of the airfoil in order to fit the mid-chord or suction side portion 14. The metal spar 13 includes radial cooling channels with pin fins to provide cooling for the blade. A leading edge radial cooling channel 21 extends along the leading edge region of the metal spar with pin fins 31 extending across the channels to provide support and increase the heat transfer effect from the metal to the cooling air passing through the channel 21. A row of film cooling holes 25 connect the leading edge radial cooling channel 21 to the suction side surface of the airfoil.

A second radial cooling channel 22 is formed in the spar along the suction side wall to provide cooling for the blade. The second radial cooling channel 22 also includes pin fins 31 extending across the channel to provide support and increase the heat transfer rate. A row of film cooling holes 26 extend along the airfoil in the spanwise direction and connect the second radial cooling channel 22 to the external surface on the suction side of the blade for film cooling.

A third radial extending cooling channel 23 extends along the suction side of the spar from the second radial cooling channel 22 and to the trailing edge of the blade. a row of exit holes 27 connect the third radial cooling channel 23 to the exterior of the blade and provide cooling for the trailing edge region of the blade. Pin fins 31 are also used in the third radial cooling channel 23. All of the radial cooling channels are connected to a cooling air supply cavity formed within the root portion of the blade that is connected to the external pressurized cooling air source to provide cooling air for the channels.

The concave opening in the metal spar 13 is sized so that the radial cooling channels will provide near wall cooling for the portions of the airfoil that is not covered by the high temperature resistant material that forms the mid-chord or suction side portion 14. Also, the opening is sized and shaped so that the mid-chord portion 14 will be secured within the opening against all but radial displacement from the spar 13. A forward hook 28 and an aft hook 29 are formed as part of the spar 13 and extend into the opening to engage similar shaped slots formed within the mid-chord portion 14 to further secure the mid-chord portion 14 to the spar 13. The forward hook 28 points in the leading edge direction and the aft hook 29 points in the trailing edge direction. The two hooks function as blade spanwise attachment hooks.

Figure 3:
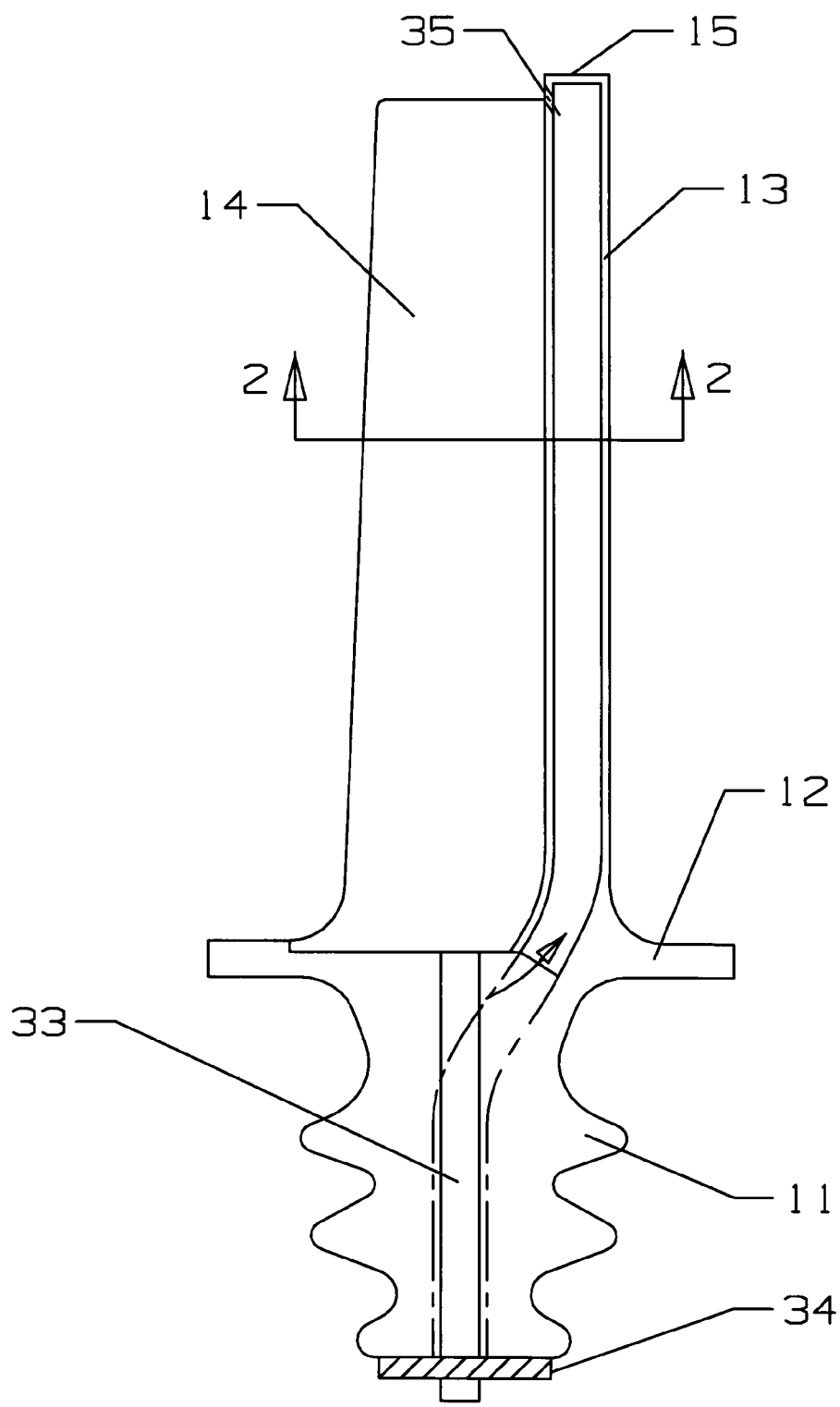
FIG. 3 shows a cross sectional side view of the composite turbine blade of the present invention.

The high temperature resistant material of the mid-chord or pressure side portion 14 is made of a ceramic matrix composite or carbon-carbon fiber material that is capable of withstanding the high temperature in the turbine without requiring cooling air. The mid-chord portion 14 is formed as a single solid piece with the slots on the suction side having a size and shape to accept the hooks extending from the spar 13. FIG. 3 shows a side view from a cross section of the composite blade with the spar 13 having a radial cooling channel 23 extending from the root 11 toward the blade tip rail 15 on the suction side of the airfoil with a row of tip rail cooling and sealing holes 35 extending along the tip rail 15 and connecting the radial cooling channel to the pocket of the tip rail 15. The mid-chord portion 14 includes a center attachment pin 33 extending from the bottom that fits into a hole formed in the root 11. An attachment lock 34 is secured to the end of the attachment pin 33 to secure the mid-chord portion 14 against radial displacement with respect to the spar 13. FIG. 2 shows the general location of the attachment pin 33 within the mid-chord portion 14 which is basically at the mass center of the mid-chord portion 14.

Because of the two piece composite turbine blade of the present invention that uses a high temperature resistant material mid-chord portion detached from the metal spar that requires cooling, the composite turbine blade can be used under higher gas flow temperatures than does the prior art single piece air cooled turbine blades. A number of major advantages are achieved from the cooling and construction design of the present invention. These include: a low cooling flow consumption due to half metal blade being used; the use of CMC or carbon-carbon high temperature resistant material on the mid airfoil mid chord section reduces the hot gas side convection surface area needed to be cooled for the spar; the use of near wall cooling for the spar structure yields a very high cooling effectiveness and therefore reduces the blade cooling flow requirement; since both side walls for the near wall cooling channel are exposed to external heat load, a low through wall thermal gradient exists for the spar structure (this eliminates the TMF issue normally experienced in the near wall cooling designs); a high temperature material is used on the pressure side of the composite blade which eliminates the main body and pressure side tip edge film cooling and therefore reduces the blade total cooling flow demand as well as reducing the manufacturing complexity; and the composite blade construction yields a lightweight blade which allows for the turbine to be designed at much higher $AN^2$.

I claim the following:

1. A composite turbine blade for use in a gas turbine engine, the blade comprising:

A root portion having a cooling air supply cavity to supply cooling air from an external source to the blade;

A metal spar extending from the root portion and forming a suction side wall, a leading edge and a trailing edge for the blade;

The metal spar forming an opening between the suction side and the leading and trailing edges of the blade;

A high temperature resistant mid-chord portion forming a pressure side surface for the blade, the mid-chord portion fitting within the opening formed within the spar; and, Attachment means to secure the mid-chord portion to the spar against a radial displacement.

2. The composite turbine blade of claim 1, and further comprising:

A plurality or radial extending cooling channels formed within the spar to provide near wall cooling for the spar.

3. The composite turbine blade of claim 2, and further comprising:

A row of film cooling holes connected to a leading edge radial cooling channel to provide film cooling for the blade.

4. The composite turbine blade of claim 2, and further comprising:

A row of film cooling holes connected to a suction side radial cooling channel to provide film cooling for the blade.

5. The composite turbine blade of claim 2, and further comprising:

The plurality of radial extending cooling channels extends from the leading edge region to the trailing edge region to provide near wall cooling for the blade along the spar.

6. The composite turbine blade of claim 5, and further comprising:

Each of the radial extending cooling channels include pin fins extending across the channel to provide support and to increase the heat transfer effect to the cooling air passing through.

7. The composite turbine blade of claim 5, and further comprising:

The trailing edge radial extending cooling passage is connected to a row of exit holes to provide cooling for the trailing edge region of the spar.

8. The composite turbine blade of claim 1, and further comprising:

A forward spanwise attachment hook and an aft spanwise attachment hook extending from the spar and into the opening; and, A forward spanwise attachment slot and an aft spanwise attachment slot formed in the mid-chord portion and positioned such that the hooks and the slots are aligned to slide the mid-chord portion onto the spar.

9. The composite turbine blade of claim 1, and further comprising:

The mid-chord portion is formed substantially from a ceramic matrix composite material or a carbon-carbon composite material.

10. The composite turbine blade of claim 1, and further comprising:

The mid-chord portion includes an attachment pin extending from the bottom to secure the mid-chord portion to the spar against radial displacement.

11. The composite turbine blade of claim 10, and further comprising:

The attachment pin is located near the mass center of the mid-chord portion.

12. The composite turbine blade of claim 1, and further comprising:

The spar forms a tip rail extending from a pressure side on the leading edge to the trailing edge;

A top surface of the mid-chord portion extends below to tip rail to form a pocket; and, A row of tip rail cooling holes extending along a portion of the tip rail and opening into the pocket to discharge cooling air from the radial cooling channels onto the pocket of the blade tip.

13. The composite turbine blade of claim 1, and further comprising:

The mid-chord portion occupies substantially the entire opening formed by the spar.

14. The composite turbine blade of claim 13, and further comprising:

A transition from the pressure side of the leading and trailing edges of the spar to the mid-chord portion is substantially smooth to form the pressure side airfoil surface.

\* \* \* \* \*